United States Patent [19]

Brennan

[11] Patent Number: 4,750,288
[45] Date of Patent: Jun. 14, 1988

[54] LINE CARRIER WEIGHT FOR DOWNRIGGER FISHING APPARATUS

[76] Inventor: Gerald B. Brennan, 710 Third St. S., Moorhead, Minn. 56560

[21] Appl. No.: 50,337

[22] Filed: May 18, 1987

[51] Int. Cl.$^4$ .................... A01K 83/00; A01K 91/00
[52] U.S. Cl. .................... 43/43.1; 43/43.12; 43/44.88; 43/44.91
[58] Field of Search .................... 43/43.1, 43.12, 44.87, 43/44.88, 44.9, 44.91

[56] References Cited

U.S. PATENT DOCUMENTS

| | | | |
|---|---|---|---|
| 2,230,751 | 2/1941 | Johnson . | |
| 2,735,212 | 2/1956 | Baum . | |
| 2,749,649 | 6/1956 | Fitzsimmons . | |
| 2,764,838 | 10/1956 | Singer | 43/44.91 |
| 2,858,637 | 11/1958 | Stark . | |
| 2,908,989 | 10/1959 | Povinelli | 43/44.88 |
| 3,738,047 | 6/1973 | Tozer . | |
| 3,816,954 | 6/1974 | Bissonette | 43/43.12 |
| 4,205,478 | 6/1980 | Emory | 43/44.91 |
| 4,453,336 | 6/1984 | Lowden | 43/43.12 |
| 4,494,334 | 1/1985 | Porter | 43/43.1 |
| 4,530,181 | 7/1985 | Ender | 43/44.88 |
| 4,656,776 | 4/1987 | Macachor | 43/43.12 |

Primary Examiner—Kurt Rowan
Attorney, Agent, or Firm—Orrin M. Haugen; Thomas J. Nikolai; Frederick W. Niebuhr

[57] ABSTRACT

A line carrier weight for use with a downrigger fishing apparatus for carrying a fishing line down the downrigger cable to a designed fishing depth above the downrigger ball. The carrier weight comprises a generally cylindrical body having an axial bore of a predetermined diameter greater than the diameter of the downrigger cable with which the carrier weight is to be used. Formed inwardly in the opposed bases of the cylindrical body are inwardly sloping, internally directed radial grooves leading to the axial bore, the radial grooves being in alignment with one another along radii which are 180° apart. A radial slit is cut through the cylindrical wall of the body and it leads to the axial bore. The width of this slit is only slightly greater than the diameter of the downrigger cable. An integrally formed arm aligned with said radial grooves projects outwardly from the cylindrical body near one of the bases and secured to the end of that arm is an eye to which a fishing line release device may be attached. Once the downrigger cable and ball are lowered into the water to a desired trolling depth and the carrier weight is fitted onto the cable by slipping the cable through the radial slit, it is free to fall down the cable passing through the axial bore of the weight until the fisherman puts tension on his fishing line. This latter action lifts up on the arm and cants the carrier weight so that its axial bore is no longer aligned with the cable. This effectively latches the carrier weight to the cable and prevents it from being pulled up or falling any deeper until such time as the fishing line tension may be released.

4 Claims, 1 Drawing Sheet

U.S. Patent   Jun. 14, 1988   4,750,288
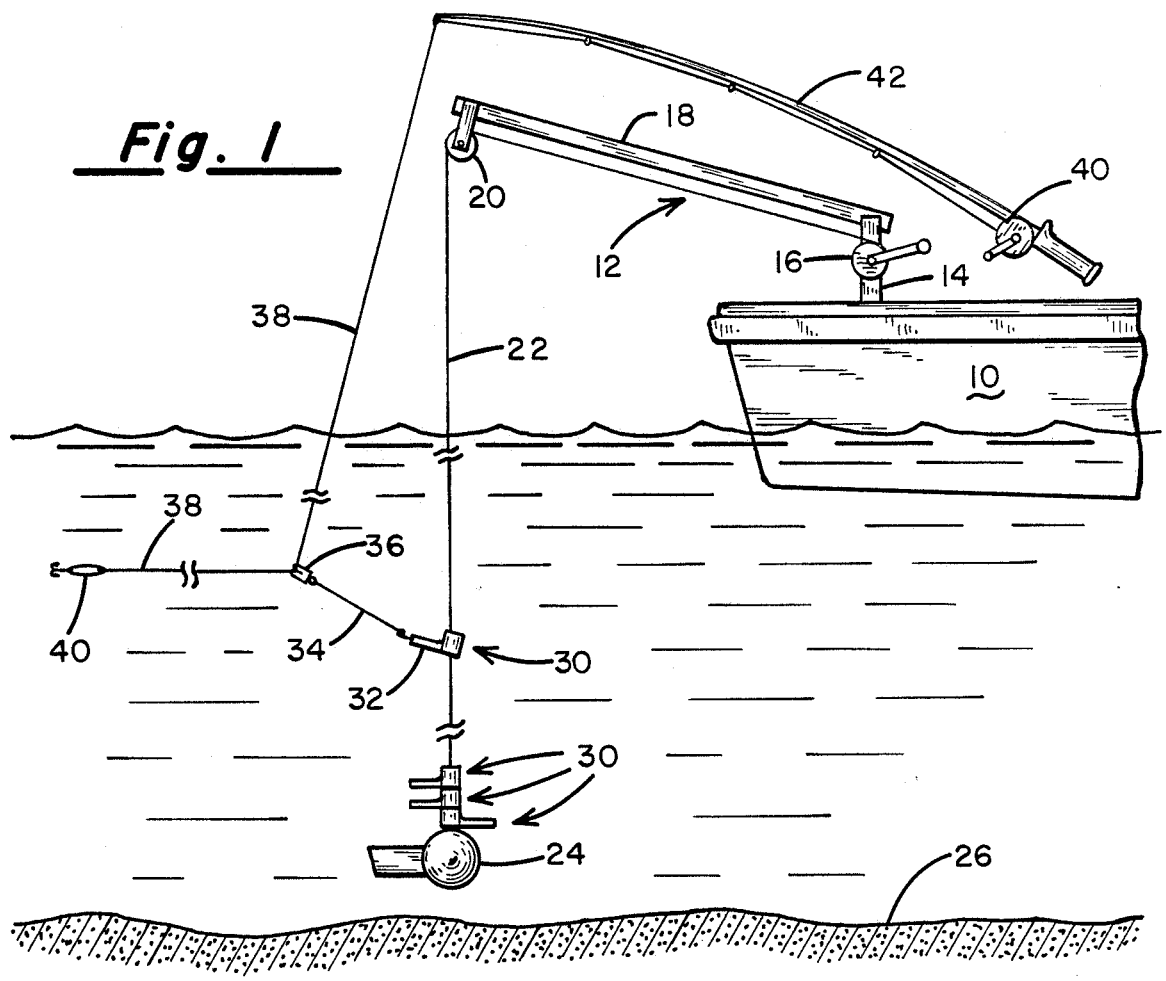
*Fig. 1*
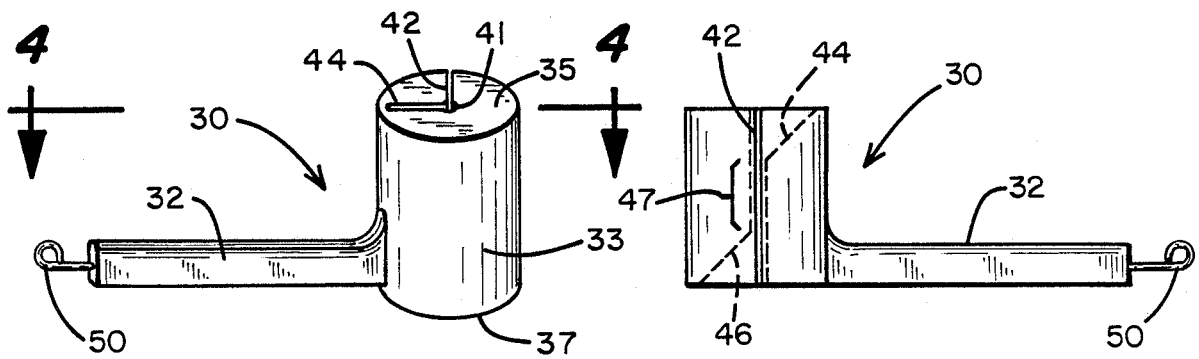
*Fig. 2*   *Fig. 3*
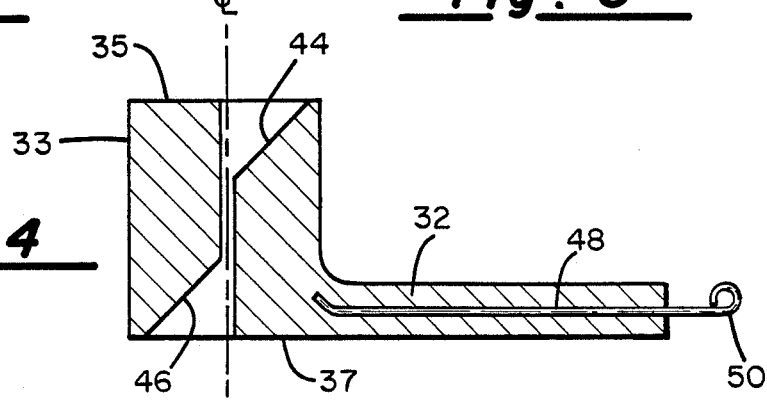
*Fig. 4*

LINE CARRIER WEIGHT FOR DOWNRIGGER FISHING APPARATUS

BACKGROUND OF THE INVENTION

I. Field of the Invention

This invention relates generally to downrigger-type fishing apparatus, and more specifically to the particular design of a carrier weight to be used therewith which allows the fisherman to control the depth at which the fishing line and lure will be deployed when trolling.

II. Discussion of the Prior Art

When fishing for certain species of fish in relatively deep water, so-called downrigger fishing has gained in popularity. Fish such as walleye pike, northern pike, lake trout, salmon are generally caught when trolling at considerable depths. Here, a fishing line is deployed from a boat as the boat is made to move slowly across the surface of the water. The motion of the boat through the water tends to make the fishing line and lure rise toward the surface unless heavy sinkers are placed on the line. The presence of heavy sinkers, however, has been found to disturb the appearance of the bait and to discourage fish from biting.

In downrigger fishing, a relatively stout line or thin cable having a heavy ball on one end thereof is deployed with the ball falling to a desired trolling depth. The weight of the ball tends to maintain the cable in a substantially vertical orientation when traversing through the water at trolling speeds. A suitable fishing line carrier in the form of a weight having a spring clamp-type line release secured thereto is slipped onto the downrigger cable while the fishing line coming from the fisherman's rod and reel is fitted into the line release clamp. The weight then carries the fishing line to the appropriate fishing depth. Once the fish takes the bait, the force of the strike pulls the fishing line free from the release clamp and the carrier weight then falls to rest on top of the ball weight on the bottom of the downrigger cable. The fisherman is then free to play and land the fish in a conventional fashion.

In the downrigger arrangement shown in the Tozer U.S. Pat. No. 3,738,047, it is intended that the carrier weight 25 move down the downrigger line 23 until it stops up against the trolling weight 24 itself. In fact, the carrier 25 is designed to loosely fit about the suspension cable and is provided with a vein 33 or 43 which interacts with the water as the boat moves to actually exert a downward force on the line carrier 25 bringing it to rest against the downrigger trolling weight 24. This design unnecessary limits the options available to the fisherman as far as the depth at which fishing is to take place and it also positions the lure at a location close to an unnatural object, i.e., the rather large trolling ball.

SUMMARY OF THE INVENTION

In accordance with the present invention, I provide a line carrier weight for a downrigger fishing assembly which can be readily coupled to the downrigger ball suspension cable by a person in the fishing boat without having to reel in the ball and which is effective to carry the fishing line to a desired fishing depth, but which then can be manipulated by the fisherman to effectively lock the carrier weight on the trolling weight suspension cable at any point along the length of the cable. This is accomplished by appropriately forming the carrier weight as a right circular cylinder having an axial bore therethrough and radially extending wedge-shaped notches formed in the respective bases of the cylinder along aligned radii and with the fish release being attachable to an integrally molded, radially projecting arm which is aligned with the common radii of the radial notches formed in the two bases of the cylinder. When the fisherman determines that his lure has reached a predetermined depth, by rendering the fishing line taut, the line carrier weight is tipped relative to the downrigger cable to create a high friction contact between the axial bore in the carrier weight and the downrigger cable. Being so tilted or tipped, an increase in the tension on the fishing line will not cause the line carrier weight to ride up the downrigger suspension cable.

OBJECTS

It is accordingly a principal object of the present invention to provide an improved line carrier weight for use in downrigger-type fishing equipment.

Another object of the invention is to provide a line carrier weight for use with downrigger fishing equipment in which the lure can be lowered to a predetermined depth rather than to the site of the trolling weight.

Still another object of the invention is to provide a line carrier weight for downrigger fishing equipment which is easy to manufacture and can be produced at relatively low cost.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a side elevation illustrating the principals of the invention;

FIG. 2 is a perspective view of the line carrier weight of the present invention;

FIG. 3 is a side elevation of the line carrier weight; and

FIG. 4 is a cross-sectional view taken along the lines 4—4 in FIG. 2.

DESCRIPTION OF THE PREFERRED EMBODIMENT

Referring first to FIG. 1, there is shown for purposes of reference a fishing boat 10 to which is attached a downrigger assembly 12 including a support stand 14 to which is secured a windlass 16 and a boom 18. Secured to the forward end of the boom is a pulley or guide 20 and a cable or line 22 exiting from the windlass 16 and played over the pulley 20 leads to a trolling weight 24 which may typically weigh in the range of from five to ten pounds.

The weight 24 is allowed to descend to a desired trolling depth a predetermined distance above the bottom 26. The weight of the ball and its shape are chosen such that at trolling speeds of approximately 1 to 4 m.p.h. the cable 22 remains fairly vertical.

Once the trolling weight is thus deployed, the fisherman next couples a line carrier weight 30 to the cable 22 in a fashion to be described and attached to an outwardly projecting arm 32 is a short leader 34 which connects to a release mechanism 36 in the form of a pincher or clamp device. The jaws of the clamp 36 releasably grip a fishing line 38 played out from a reel 40 on a fishing rod 42 which is adapted to be held by the fisherman or placed ini a rod holder. The free end of the line 38 then leads to a hook or lure 40 on which the bait is secured.

As will be further explained, the line carrier weight 30 is allowed to descend along the cable 22 to a desired fishing depth which, typically, will be some distance above the trolling weight 24. When the desired depth is reached, the fisherman will apply tension to the fishing line 38 to tip the carrier weight 30 relative to the line 22 and, in doing so, will effectively latch the carrier weight 30 to the line 22 preventing the carrier weight from rising up the cable 22. The fisherman will be able to lower the lure or hook 40 by releasing the tension on the fishing line 38, but upward movement of the weight 30 on the downrigger cable is prevented. When a fish takes the bait, it pulls the line 38 free of the release clamp 36, relieving the tension on the arm 32. The weight 30 then falls to rest against the top of the ball 24. When several such fish cycles have been completed, the weight 24 can be reeled up and the lure carrier weights 30 removed therefrom for reuse.

Having described the overall configuration of the downrigger assembly with the aid of FIG. 1, attention will next be directed to the specifics of the invention which resides in the line carrier weight 30. With reference to FIGS. 2 through 4, the line carrier is seen to include a mass of heavy material, typically lead or a lead alloy, in the form of a right cylinder, here shwen as a right circular cylinder 33. The cylinder 33 has an upper base 35 and a lower base 37 and a radially projecting arm 32 integrally molded with the cylinder portion 33 proximate the lower base 37.

A bore 41 of a predetermined diameter greater than that of the cable 22 is axially disposed through the right circular cylinder 33 and a slit 42 passes radially through the cylinder portion from its periphery to the axial bore 41. This allows the carrier weight 30 to be positioned on the cable 22 by pressing the weight onto the cable until it passes through the radial slit 42 and loosely resides in the axial bore 41.

Next, and with particular reference to FIGS. 3 and 4, it can be seen that there is formed inwardly from the bases 35 and 37 V-shaped grooves 44 and 46 which slope downwardly and inwardly from near the periphery of the cylinder to the central bore 41 along aligned radii of the cylinder. That is to say, the length dimension of the grooves 44 and 46 lie on a common diameter and are on opposite sides of the center line (CL) as illustrated. Also, the angle of inclination of the V-shaped grooves are such that they intersect with the central bore 41 so as to leave a predetermined offset 47 therebetween.

Completing the assembly, there is provided a stiffening wire 48 which is placed in the mold at the time that the molten metal is cast which adds rigidity to the arm 38, especially when the metal employed for the weight 30 is lead. The end of the wire 48 projects outwardly from the end of the arm 38 and is formed into an eye 50 to facilitate the attachment of the leader 34 thereto.

For purposes of illustration and with no limitation intended, typical dimensions for the line carrier weight 30 may be as follows:

| | |
|---|---|
| Diameter of cylinder 33 | 1 in. |
| Height of cylinder 33 | 1 in. |
| Length of arm 32 | 1½ in. |
| Diameter of bore 41 | 7/64th in. |
| Width of grooves 44–46 | 3/16th in. |
| Depth of grooves 44–46 | 0 ⅜th in. |
| Length of offset 47 | ¼th in. |

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A downrigger fishing apparatus of the type including a windlass mountable in a boat and carrying a supply of flexible line leading to a relatively heavy trolling weight to permit the trolling weight to be lowered on said flexible line to a predetermined depth while said boat is moving at trolling speeds, an improved fishing line carrier for maintaining the fishing lure on the of a fishing line at a desired depth along said flexible line when trolling, comprising a weight including means connectable thereto for releasably gripping said fishing line at a point a predetermined distance from said lure:
    (a) said weight being in the general form of a right cylinder having an axial bore extending the entire height dimension thereof and a radial slit extending from the periphery thereof to said axial bore for allowing entry of said flexible line into said axial bore; and
    (b) said weight further being secured to said flexible line and including means for limiting movement of said weight to unidirectional downward motion along said flexible line, said means for limiting movement of said line carrier weight including first and second inwardly sloping aligned grooves formed in the respective opposed bases of said right cylinder, said grooves extending into said axial bore and being vertically offset from one another along said axial bore, whereby canting of said line carrier weight on said flexible line creates frictional drag between said line carrier weight and said flexible line precluding upward movement of said line carrier weight irrespective of the force applied through said fishing line.

2. The line carrier as in claim 1 wherein said right cylinder is a right circular cylinder.

3. The line carrier as in claim 1 wherein said line carrier weight further includes a radially outwardly projecting arm member aligned with the radii common to said groove; and means for securing said fishing line clamp to the end of said arm member whereby upward tension on said fishing line causes said line carrier weight to cant on said flexible line.

4. The line carrier as in claim 3 wherein said line carrier weight is molded lead.

* * * * *

UNITED STATES PATENT AND TRADEMARK OFFICE
CERTIFICATE OF CORRECTION

PATENT NO. : 4,750,288
DATED : June 14, 1988
INVENTOR(S) : Gerald B. Brennan

It is certified that error appears in the above-identified patent and that said Letters Patent is hereby corrected as shown below:

Column 4, Line 31, before "of" insert -- end --.

Signed and Sealed this

Thirteenth Day of December, 1988

Attest:

DONALD J. QUIGG

*Attesting Officer*    *Commissioner of Patents and Trademarks*